Nov. 6, 1951 P. R. J. COURT 2,574,245

APPARATUS INCORPORATING A CATHODE-RAY DEVICE,
PARTICULARLY TELEVISION RECEIVERS

Filed Sept. 14, 1949

Inventor
PATRICK RICHARD JAMES COURT
By Blair + Black
Attorneys

Patented Nov. 6, 1951

2,574,245

UNITED STATES PATENT OFFICE 2,574,245

APPARATUS INCORPORATING A CATHODE-RAY DEVICE, PARTICULARLY TELEVISION RECEIVERS

Patrick Richard James Court, Cambridge, England, assignor to Pye Limited, Cambridge, England, a British company Application September 14, 1949, Serial No. 115,696
In Great Britain September 17, 1948

8 Claims. (Cl. 315—27)

Figures 1, 2, 3:
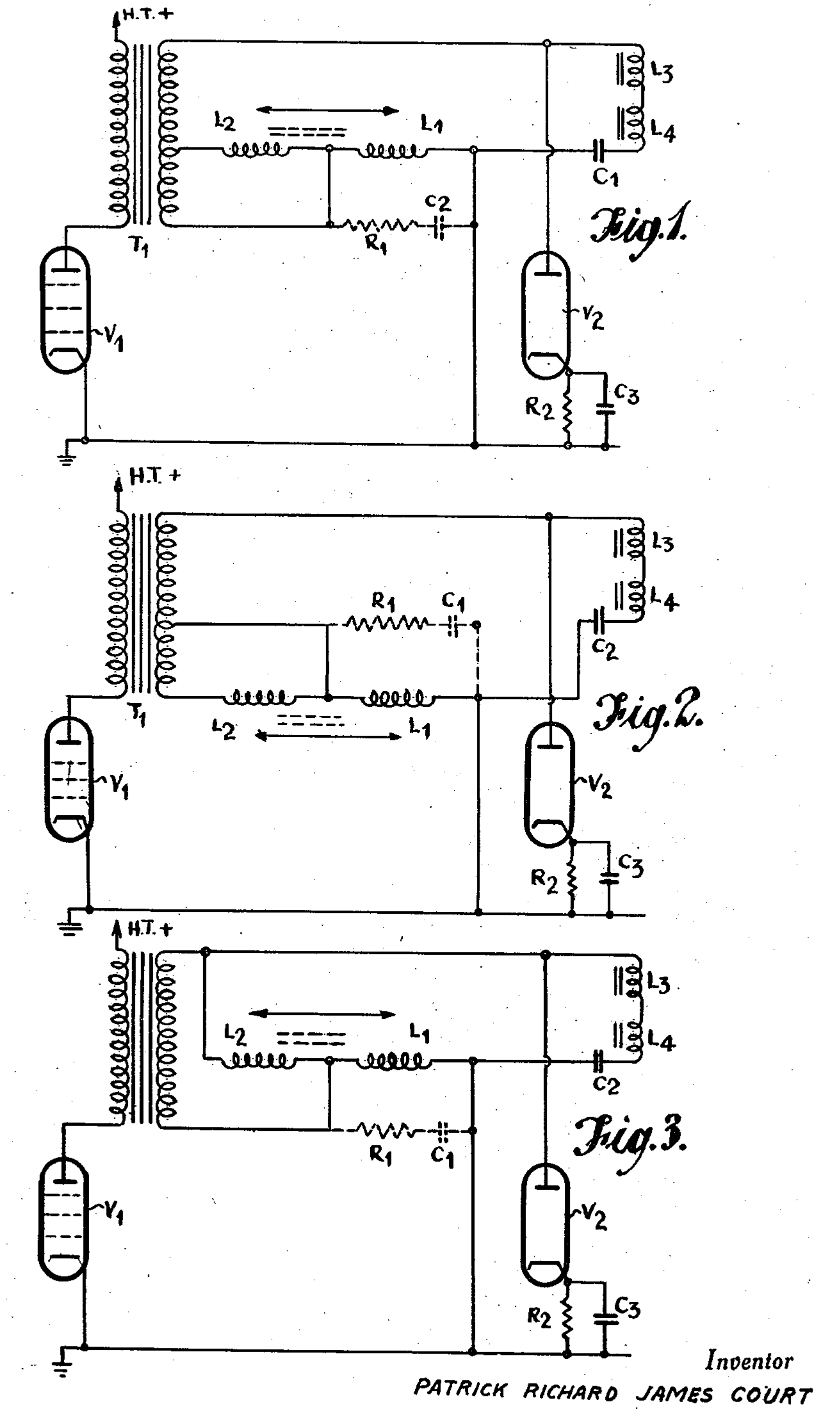

The present invention relates to apparatus incorporating a cathode ray device, and particularly to television receivers, and has for its object to provide a means for controlling or adjusting the scanning amplitude of the cathode ray beam. More particularly, the invention concerns line scanning circuits in which the secondary winding of the scanning output transformer is shunted by a limiting diode (often called an efficiency diode). The invention is particularly advantageous where the extra high tension for the cathode ray device is derived from the line scan flyback.

The present invention provides an arrangement for varying the scanning amplitude of the cathode ray beam which produces a minimum or no effect upon the linearity of the scan, nor upon the extra high tension if it be derived from the line scan flyback.

The invention consists in varying the scanning amplitude of a line scanning circuit of the kind referred to by means of a variable inductance which is connected in series with the deflecting coils. The variable inductance is connected in the circuit between the line scan output transformer and the efficiency diode so that the diode effectively suppresses "ringing" both in the transformer and the series inductance.

The inductance is preferably varied by varying its permeability, for example by moving a ferro-magnetic core into or out of the inductance. By increasing the impedance of the inductance, the scanning amplitude is decreased. If desired the inductance may be shunted by a damping circuit comprising a variable resistance and a capacity connected in series.

According to a feature of the invention, a second variable inductance is shunted across the whole or part of the scanning output transformer secondary. By decreasing the impedance of this shunt inductance the scanning amplitude is decreased. It is an advantage if the inductance is shunted across a portion of the transformer secondary, as the inductance may then be of smaller and more practicable proportions, while achieving the same effect.

The two inductances, series and shunt, are simultaneously varied in opposite directions, so as to maintain the circuit impedance substantially constant. To this end the two coils may be associated with a common ferro-magnetic core which can be moved from one inductance into the other. With known circuit conditions and a known value of core permeability, the values and spacing of the two inductances may be established such that, on moving the core into the series inductance, and consequently simultaneously moving it out of the shunt inductance, the scanning amplitude may be decreased whilst maintaining substantially constant the impedance reflected back into the line output transformer.

In order that the present invention may be more fully understood three embodiments will now be described by way of example with reference to the accompanying drawings which show three alternative circuit arrangements in Figs. 1, 2 and 3 respectively.

Referring to Fig. 1, the output valve V1 of the line scanning generator has a scanning output transformer T1 connected in its anode circuit. The secondary winding of the transformer T1 is connected through a variable inductance L1 and the blocking condenser C1 to the line scanning coils L3 and L4. A second variable inductance L2 is connected between one end of the inductance L1 and a tapping on the secondary of the transformer T1. Advantageously the inductance L1 and L2 are so coupled together that when the inductance of L1 is increased the inductance of L2 is simultaneously decreased. This may be achieved by moving a ferro-magnetic core out of the inductance L1 at the same time as a ferro-magnetic core is moved into L2. If desired, a common core may be used and moved between L1 and L2.

The connection between the inductance L1, and the blocking condenser C, is connected to earth. The anode of a limiting diode V2 is connected to the other end of the secondary winding to L3, while the cathode of the diode V2 is connected through a resistance bypassed by a condenser C3 to earth.

With this arrangement the amplitude of the scan is varied by varying the inductance of L1, L2 being varied in the opposite sense to L1 so as to maintain a substantially constant circuit impedance. The variable inductance L2 is connected between the scanning output transformer T1 and the limiting diode V2 so that the diode effectively suppresses "ringing" both in the transformer and the series inductance. If desired, a damping network comprising a resistance R1 in series with the condenser R2 may be connected across the inductance L1.

In the alternative circuit arrangement shown in Fig. 2 the deflecting coils L3 and L4 are fed through the series variable inductance L1 and the blocking condenser C2 from a tapping on the secondary winding of the line scanning output transformer T1 and the shunt variable inductance L2 is connected between this tapping and the end of the secondary winding. In operation this arrangement is very similar to Fig. 1.

In the circuit shown in Fig. 3 the line scanning coils L3 and L4 are fed through the variable series inductance L1 and the blocking condenser C2 from the whole of the secondary winding. This arrangmenet requires that the value inductance of the shunt inductance L2 should be greater than that required if the shunt inductance is connected across only a part of the secondary winding of the output transformer T1.

It has to be understood that the above circuit arrangement are described by way of example only and that modifications may be made within the scope of the appended claims.

I claim:

1. In a television receiver, a cathode ray tube means for magnetically deflecting the beam of said cathode ray tube, a scanning output transformer having a primary winding and a secondary winding, a source of deflecting signals connected to the primary winding of said transformer, a first inductance coil connected directly in parallel across at least part of said secondary winding a second inductance coil connected in series between said first inductance coil and said deflecting means, means for simultaneously varying the inductance values of said first and second inductance coils in opposite senses and such that the impedance between the said transformer and said deflecting means remains substantially constant, and a limiting rectifier connected across said deflecting means.

2. In a television receiver, a cathode ray tube, means for magnetically deflecting the beam of said cathode ray tube, a scanning output transformer having a primary winding and a secondary winding, a source of deflecting signals connected to the primary winding of said transformer, a first inductance coil connected directly in parallel across part of said secondary winding a second inductance coil connected in series between said secondary winding and said deflecting means one end of said second inductance coil being connected directly to one end of said secondary winding, means for simultaneously varying the inductance values of said first and second inductance coils in opposite senses, and such that the impedance between the said transformer and said deflecting means remains substantially constant, and a limiting rectifier connected across said deflecting means.

3. In a television receiver, a cathode ray tube, means for magnetically deflecting the beam of said cathode ray tube, a scanning output transformer having a primary winding and a secondary winding, a source of deflecting signals connected to the primary winding of said transformer, a first inductance coil connected directly between one end of said secondary winding and an intermediate point thereof, a second inductance coil connected in series between said secondary winding and said deflecting means, one end of said second inductance coil being connected to one end of said secondary winding through said first inductance coil, means for simultaneously varying the inductance values of said first and second inductance coils in opposite senses, and such that the impedance between the said transformer and said deflecting means remains substantially constant and a limiting rectifier connected across said deflecting means.

4. In a television receiver, a cathode ray tube, means for magnetically deflecting the beam of said cathode ray tube, a scanning output transformer having a primary winding and a secondary winding, a source of deflecting signals connected to the primary winding of said transformer, a first inductance coil connected directly in parallel across the whole of said secondary winding, a second inductance coil connected in series between said secondary winding and said deflecting means, one end of said second inductance coil being connected, directly to one end of said secondary winding, means for simultaneously varying the inductance values of said first and second inductance coils in opposite senses, and such that the impedance between the said transformer and said deflection means remains substantially constant and a limiting rectifier connected across said deflecting means.

5. In a television receiver, a cathode ray tube, means for magnetically deflecting the beam of said cathode ray tube, a scanning output transformer having a primary winding and a secondary winding, a source of deflecting signals connected to the primary winding of said transformer, a first inductance coil connected directly in parallel across at least part of said secondary winding, a second inductance coil connected in series between said first inductance coil and said deflecting means, a common magnetic core member associated with both said first and second inductance coils for simultaneously varying the inductance values of said first and second inductance coils in opposite senses, and such that the impedance between the said transformer and said deflection coils remains substantially constant and a limiting rectifier connected across said deflecting means.

6. Apparatus as claimed in claim 5, wherein a damping network comprising a series connected resistor and capacitor is connected in parallel across said second inductance coil.

7. In a television receiver a cathode ray tube, means for magnetically deflecting the beam of said cathode ray tube, a scanning output transformer having a primary winding and a secondary winding, a source of deflecting signals connected to the primary winding of said transformer, a first inductance coil connected directly in parallel across at least part of said secondary winding, a second inductance coil connected in series between said first inductance coil and said deflecting means, a damping network connected in parallel across said second inductance coil, means for simutlaneously varying the inductance of said first and second inductance coils in opposite senses and such that the impedance between the said transformer and said deflecting means remains substantially constant, and a limiting rectifier connected across said deflecting means.

8. Apparatus as claimed in claim 7, wherein the damping network comprises a resistor and a capacitor connected in series.

PATRICK RICHARD JAMES COURT.

REFERENCES CITED

The following references are of record in the file of this patent:

UNITED STATES PATENTS

| Number | Name | Date |
|---|---|---|
| 2,438,359 | Clapp | Mar. 23, 1948 |
| 2,440,418 | Tourshou | Apr. 27, 1948 |
| 2,443,030 | Foster | June 8, 1948 |
| 2,498,007 | Schade | Feb. 21, 1950 |